United States Patent
Marce et al.

(10) Patent No.: US 7,567,563 B2
(45) Date of Patent: Jul. 28, 2009

(54) METHODS AND SYSTEMS FOR DETECTING MALFUNCTIONING NODES IN A TELECOMMUNICATION NETWORK

(75) Inventors: Olivier Marce, Massy (FR); Damien Galand, Chaville (FR)

(73) Assignee: Alcatel, Paris (FR)

( * ) Notice: Subject to any disclaimer, the term of this patent is extended or adjusted under 35 U.S.C. 154(b) by 650 days.

(21) Appl. No.: 11/076,899

(22) Filed: Mar. 11, 2005

(65) Prior Publication Data
US 2005/0201374 A1 Sep. 15, 2005

(30) Foreign Application Priority Data
Mar. 12, 2004 (FR) .................................. 04 50509

(51) Int. Cl.
*H04L 12/28* (2006.01)
*G06F 15/173* (2006.01)

(52) U.S. Cl. ........................ 370/389; 370/390; 709/238

(58) Field of Classification Search ......... 370/248–250, 370/349, 351, 389, 390, 392, 395.3, 395.31, 370/464–465, 471, 218, 225, 236–242, 432, 370/472; 709/203, 234, 245, 238, 220–222
See application file for complete search history.

(56) References Cited

U.S. PATENT DOCUMENTS

| | | | |
|---|---|---|---|
| 5,065,399 A | | 11/1991 | Hasegawa et al. |
| 7,088,706 B2* | | 8/2006 | Zhang et al. ................. 370/352 |
| 7,120,118 B2* | | 10/2006 | Rajagopal et al. ........... 370/237 |
| 7,177,295 B1* | | 2/2007 | Sholander et al. ........... 370/338 |
| 7,246,173 B2* | | 7/2007 | Le et al. ..................... 709/238 |
| 2001/0014089 A1* | | 8/2001 | Okajima et al. ............. 370/338 |
| 2002/0088698 A1 | | 7/2002 | Sasaki |
| 2002/0107023 A1* | | 8/2002 | Chari et al. ................. 455/445 |
| 2003/0118051 A1* | | 6/2003 | Ooms ........................ 370/471 |
| 2004/0034714 A1* | | 2/2004 | Garakani et al. ............. 709/238 |
| 2005/0036486 A1* | | 2/2005 | Sahinoglu et al. ........... 370/389 |
| 2005/0063312 A1* | | 3/2005 | Liu ........................... 370/248 |
| 2005/0281291 A1* | | 12/2005 | Stolfo et al. ................ 370/506 |
| 2006/0007863 A1* | | 1/2006 | Naghian ..................... 370/238 |

FOREIGN PATENT DOCUMENTS

WO      WO 01/19038 A      3/2001

OTHER PUBLICATIONS

"Ad hoc On-Demand Distance Vector Routing." Proceedings of the 2nd IEEE Workshop on Mobile Computing Systems and Applications, pp. 90-100, Feb. 1999.*
Johnson, David et al., "The Dynamic Source Routing Protocol for Mobile Ad Hoc Networks", Apr. 15, 2003, IETF MANET Working Group, pp. 1-111.*
Perkins, Charles et al., "Adhoc On-Demand Disctance Vector (AODV) Routing", Feb. 17, 2003, Moible Ad Hoc Networking Working Group, pp. 1-35.*
Richard Stevens, W: "TCP/IP Illustrated vol. 1," 1994, Addison-Wesley, Reading, MA, USA, XP002308277.

* cited by examiner

*Primary Examiner*—Aung S Moe
*Assistant Examiner*—Redentor M Pasia
(74) *Attorney, Agent, or Firm*—Sughrue Mion, PLLC

(57) ABSTRACT

The request for the response from the sender to the receiver is dynamically routed via a first route traversing the network nodes. Addresses of the traversed network nodes are recorded in an order of traversing in the request. A second route is determined based on the recorded addresses of the nodes. A supplemental packet is generated. The supplemental packet is transmitted to the sender of the request via the determined second route, from a node address to a node address. The response is dynamically routed to the sender of the request by reversely traversing the first route.

14 Claims, 3 Drawing Sheets

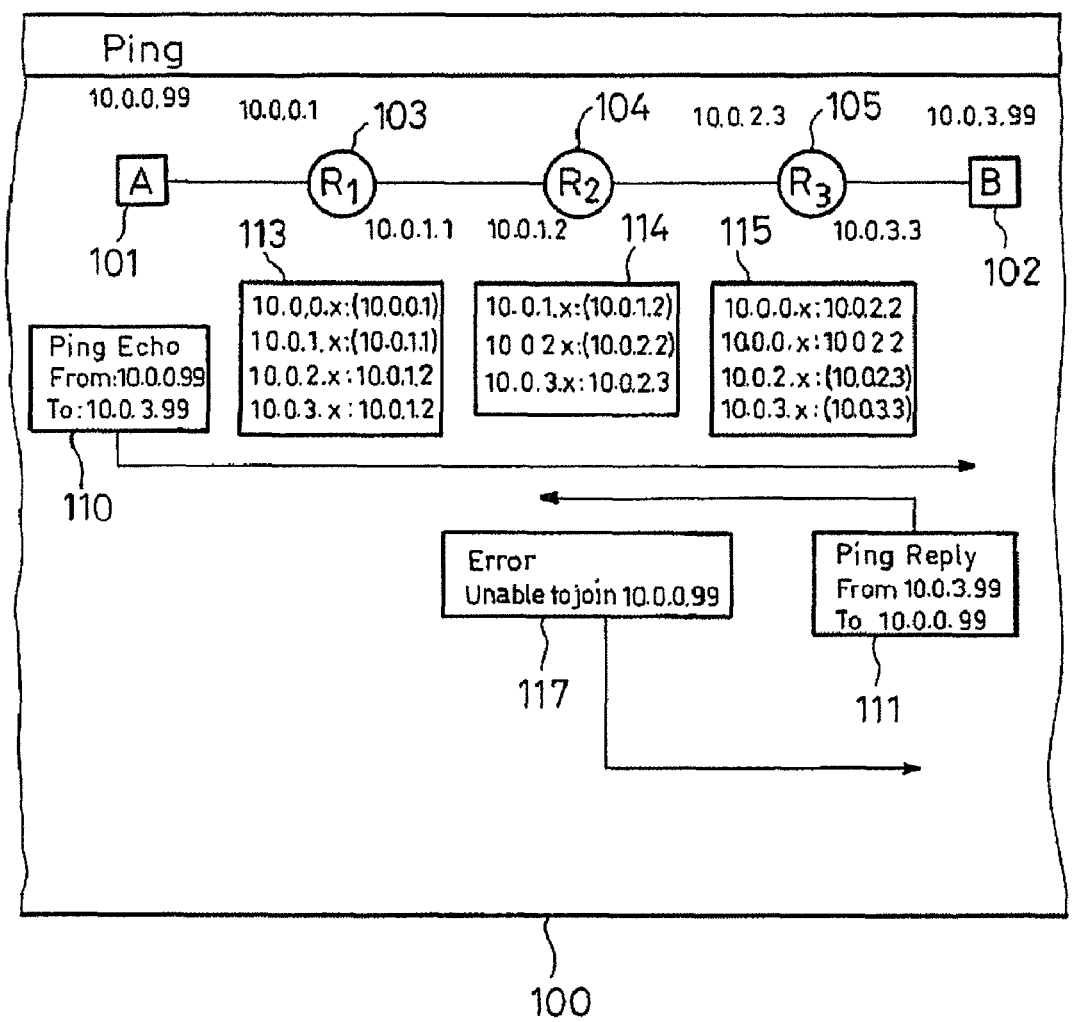

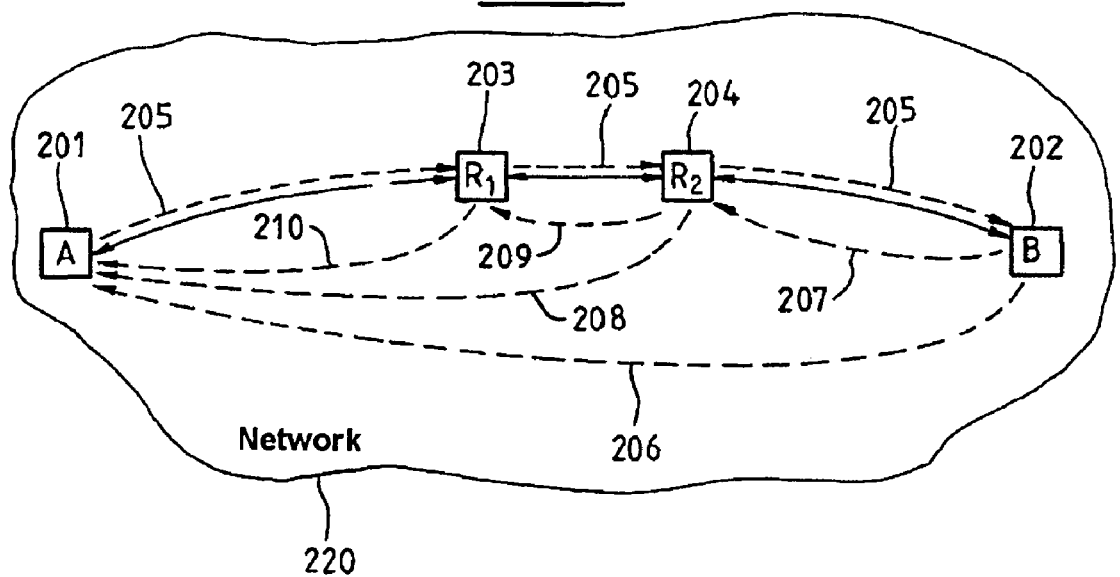
FIG_2
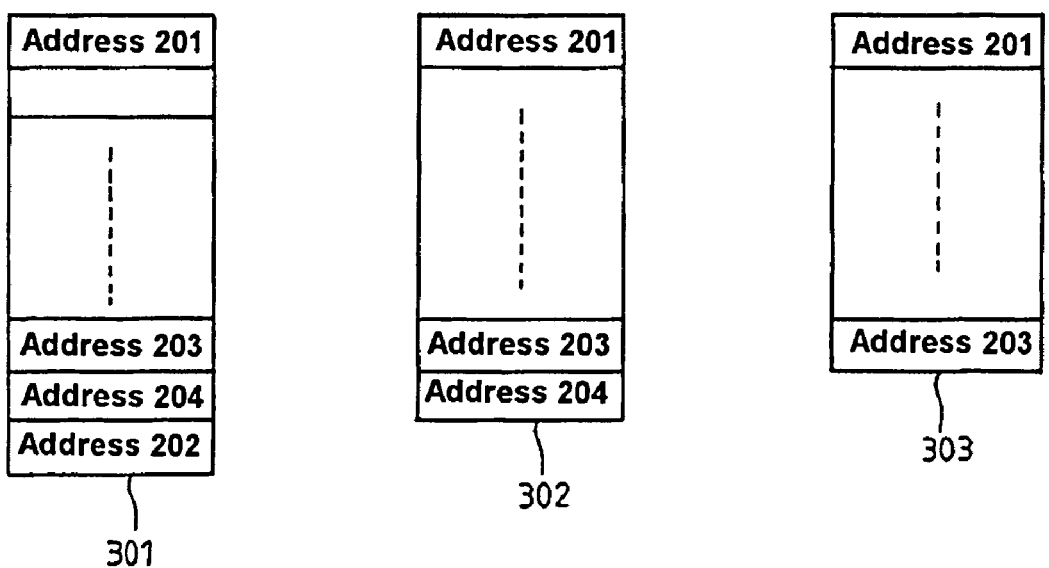
FIG_3

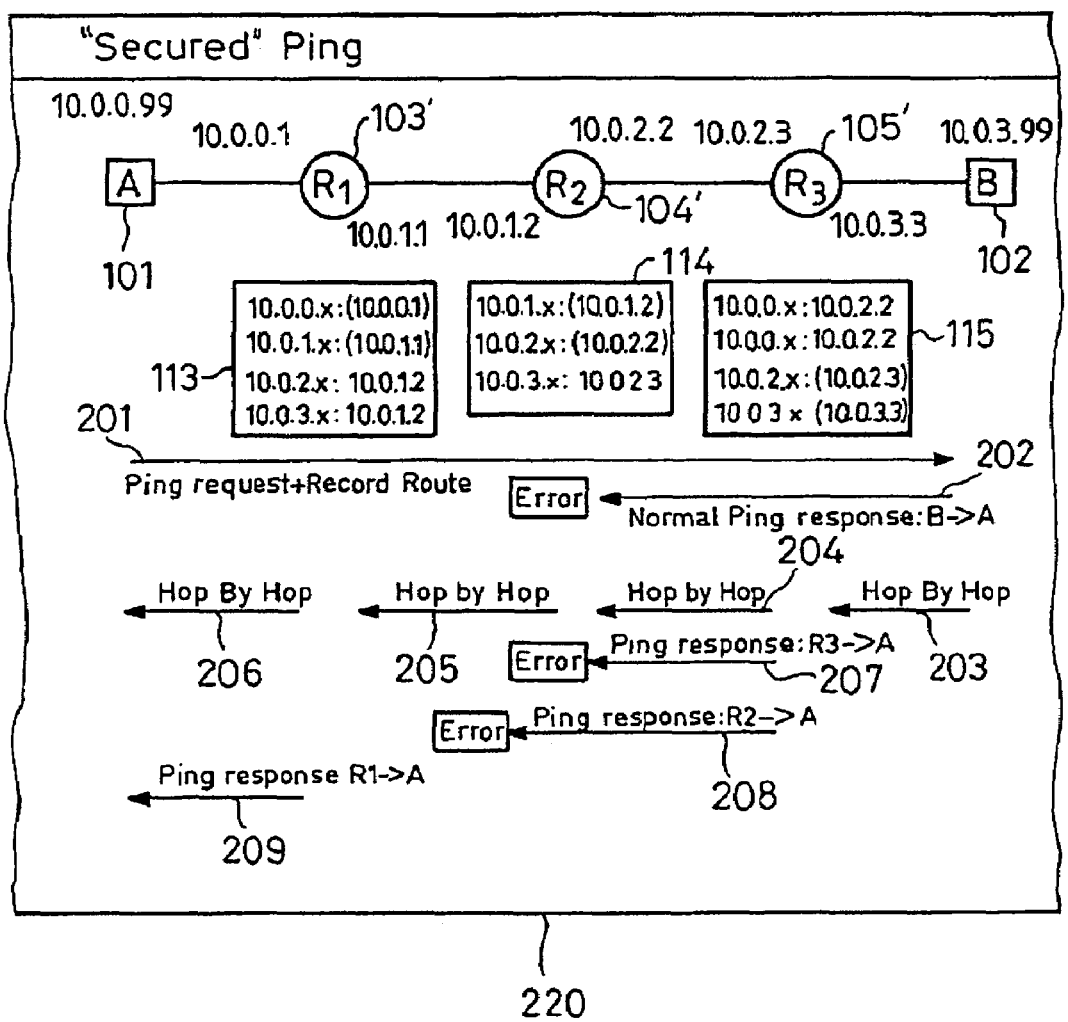
FIG_4

METHODS AND SYSTEMS FOR DETECTING MALFUNCTIONING NODES IN A TELECOMMUNICATION NETWORK

CROSS-REFERENCE TO RELATED APPLICATIONS

This application is based on French Patent Application No. 04 50 509 filed Dec. 3, 2004, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of transmitting packets of data in a telecommunication network and to a system for implementing that method, in particular for analyzing the network in the event of a malfunction.

2. Description of the Prior Art

In a telecommunication network such as the Internet, information can be sent from a sender to a receiver in the form of packets, a packet being a group of data having a format defined by the communication protocol of the network and provided with a header in which the addresses of the sender and receiver of the packet are indicated.

The packet is transmitted in the network via different nodes of the network, a node being an element able to read the address of the receiver of a packet to forward the packet to a subsequent node so that, by repeating these forwarding operations from node to node, the packet is transmitted from the sender to the receiver along an optimum route in the network in terms of distance, time and congestion, for example.

Consequently, the nodes of a network are called routers. In the case of the Internet, when a first router receives a packet intended for an address coded in accordance with the Internet Protocol (IP), that router consults internal routing tables associating groups of IP addresses of receivers with one or more IP addresses of second routers to which this first router can forward this packet.

Accordingly, as a function of its routing tables, the first router transmits the received packet to a second router, this routing mode being referred to hereinafter as the dynamic routing mode.

In other words, the route for routing packets between the nodes of the network is not predetermined because the routers are configured to route the packets optimally as a function of the network traffic, for example. In this case, the second server selected by a first server for the transmission of a packet varies as a function of the network traffic conditions.

Moreover, a packet of data may be lost if a first node directs that packet to a second node when the connection between these nodes is interrupted or when the first node has a configuration error in its routing table, as a result of which the pocket of data is not transmitted or is forwarded to a non-existent node.

If this kind of malfunction occurs, it is necessary to warn the sender of the packet that it has not reached its receiver.

To this end, it is known in the art to use a method referred to hereinafter as the "ping" method that consists in sending a packet with no particular content to a receiver so that, on receiving this packet, the latter returns an acknowledgement or response to the sender.

In the case of the Internet, the ping method consists in sending from a sender A to a receiver B a packet comprising a request that is called the ECHO_REQUEST message when it is sent and is defined by the Internet Control Message Protocol (ICMP).

When the receiver B receives the request, it sends a response called the ECHO_REPLY message to the sender A, interchanging the addresses of the sender and receiver in the header of the packet sent, compared to the ECHO_REQUEST message, this method checking for correct operation of the system at the point B.

The present invention stems from the observation that, if a connection between two routers is broken, a packet may be lost when the response is transmitted, in which case it is not possible for the sender of the request to be advised of the origin of the incident.

In fact, the sender of the response is the receiver of the request, and so the error message arising from the loss of this response is delivered to the receiver of the request and not to its sender.

This situation is depicted in FIG. 1, which represents a network 100 that consists of routers 103, 104 and 105 and in which communication is based on the Internet Protocol (IP). Each router forms the interface between two subnetworks with its own address in each of those subnetworks and terminals 101 and 102 each having a unique IP address.

A request 110 is sent from the terminal 101 to the terminal 102 via the routers 103, 104 and 105. To this end, these routers 103, 104 and 105 use their respective routing tables 113, 114 and 115 and the address 10.0.0.99 of the sender and the address 10.0.3.99 of the receiver of the request 110.

Accordingly, this request 110 is sent to the first router 103 with the addresses 10.0.0.1 and 10.0.1.1, its routing table 113 telling it that messages sent to the addresses 10.0.3.x, where x is an integer from 0 to 255, must be routed to the router with the address 10.0.1.2, i.e. the router 104.

An operation of reading routing tables of this kind is then repeated in the routers 104 and 105 in succession, with the result that the request 110 reaches the terminal 102 of the network with the address 10.0.3.99.

After receiving the request 110, the terminal 102 sends a response 111 giving its own address 10.0.3.99 as the sender address and the address 10.0.0.99 of the terminal 101 as the receiver address.

However, the routing table of the router 104 has a configuration error on the route of the response 111. In fact, its routing table does not specify how messages with addresses 10.0.0.x are to be routed, and the response 111 is therefore lost.

In this case, the server 105 sends an error message 117, but it sends it to the sender of the response 111, i.e. to the receiver 102 of the request.

Thus the sender of the request (terminal 101) is not able to identify the network malfunction.

The present invention aims to solve this problem by using a method such that, if the network malfunctions during the transmission of a response to a request, the sender of the request is informed of the malfunction.

SUMMARY OF THE INVENTION

Thus the invention concerns a method of transmitting data packets in a telecommunication network made up of nodes for dynamically routing successive packets sent by a sender to a receiver so that the packets may be routed along different routes and using a protocol such that a receiver receiving a request transmits a response to the sender of the request, in which method, at one or more nodes of the network, the response is routed dynamically to the sender and a supplemental packet is generated that is to be sent to the sender of the request and whose route is predetermined.

This kind of method uses supplemental packets that take a route separate from the route determined dynamically, these packets informing the sender of the request of the elements of the network that are functioning correctly.

It should be noted that, because of the multiplication of messages sent correctly (2n+1 messages are sent for a route comprising n nodes), this method is particularly useful for analyzing a network during a malfunction, i.e. on a one-off basis, in order to limit the data traffic that it generates.

In one embodiment, the predetermined route comprises at least one node on the route of the request.

In one embodiment, the predetermined route is the converse of the route of the request In one embodiment, the supplemental packet comprises a body identical to the body of the response.

In one embodiment, the node is a router using dynamic routing tables to forward a packet as a function of parameters such as the transmission delay and the network traffic.

In one embodiment, the network is the Internet.

In one embodiment, the route of the request is recorded as the request passes through the nodes of the network.

The invention also concerns a server for transmitting data packets in a telecommunication network made up of nodes for dynamically routing successive packets sent by a sender to a receiver so that the packets may be routed along different routes and using a protocol such that a receiver receiving a request transmits a response to the sender of the request, which server comprises means whereby said response is routed dynamically to said sender and means whereby a supplemental packet is generated that is to be sent to the sender of said request and whose route is predetermined.

In one embodiment the packet transmission server comprises means whereby the predetermined route comprises at least one node on the route of the request.

In one embodiment, the packet transmission server comprises means whereby the predetermined route is the converse of the route of the request.

In one embodiment, the packet transmission server comprises means whereby the supplemental packet comprises a body identical to the body of the response.

In one embodiment, the packet transmission server is a router node using dynamic routing tables to forward a packet as a function of parameters such as the transmission delay or the network traffic.

In one embodiment, the packet transmission server is the Internet.

In one embodiment, the packet transmission server comprises means whereby the route of the request is recorded as the request passes through the nodes of the network.

Other features and advantages of the invention will become apparent from the description given hereinafter by way of non-limiting example and with reference to the appended drawings.

BRIEF DESCRIPTION OF THE DRAWINGS

FIG. 1, already described, represents the known functioning of a packet telecommunication network.

FIG. 2 represents a packet routing method of the invention.

FIG. 3 represents a routing table of a node of the invention.

FIG. 4 represents the functioning in accordance with the invention of a packet telecommunication network.

DETAILED DESCRIPTION OF THE PREFERRED EMBODIMENT

In the preferred embodiment of the invention described hereinafter, communications within the network use the Internet Protocol (IP) and the nodes comprise routers as defined above.

Also, this embodiment uses two IP options known in the art, namely the Record Route (RR) and Source Routing (SR) options defined in the Request for Comments (RFC) 791 issued by the Defense Advanced Research Projects Agency (DARPA) in September 1981.

When the RR option is active, the addresses of the various routers through which a data packet passes are recorded in the body of that packet as it travels along its route; the SR option is used to impose the route that the packet must take by indicating the addresses of the successive routers to be visited.

Moreover, when sending a data packet from a sender A to a receiver B (FIG. 2), the Record Route option is activated so that, when the node B sends a response, it sends, in addition to the prior art response, whose route is determined dynamically, a supplemental packet using the SR function, i.e. comprising the modified list of the addresses of the various routers recorded as the request traveled along its route.

In this example, that list is obtained by modifying the list of addresses recorded in the body of the request by deleting the last address from that list, i.e. the address of the node B.

This supplemental packet reaches the last node of the network visited by the request and, at that node, repeats the procedure effected at the level of the receiver B, i.e. sends a response that is routed dynamically to the node A and a supplemental packet whose route is imposed and consists of the route that is the converse of that taken by the request.

To this end, the same protocol is used as before with the SR option, entering as a parameter the modified list of the routers on the route of the request obtained by modifying the list recorded by the request by deleting the last address from the list.

FIG. 2 represents one embodiment of the invention.

Thus a request 205 is sent from the node A 201 to the node B 202 via the packet telecommunication network 220. This request is routed normally over its route to the node 202 in the course of which it visits the nodes 203 and 204.

On arriving at the node 202, the Record Route function has recorded in the body of the request a list 301 of the addresses of the various routers visited along the route of the message (FIG. 3).

The final entries in this list are therefore the successive addresses of the nodes 203, 204 and 202.

In response to the request 205, the node 202 sends a response 206 that is routed dynamically and a packet 207 with the SR option activated, with the list 302 as a parameter, that list 302 consisting of the list 301 of the request with the last item, i.e. the address of the node B, removed. The SR option sends the message 207 to the last address from the list 302, i.e. to the node 204.

Once the node 204 has received this message 207, the procedure is repeated. Accordingly, the node 201 is sent a response 208 that is dynamically routed, in the same way as a ping response to a request sent to the node 204. An additional message 209 is sent to the last address of the list 303 derived from the list 302, and so on until the forcibly routed additional message reaches the node 201.

FIG. 4 illustrates the application of the invention to the particular situation of FIG. 1 already described. In this case, the request 201 routed from the terminal 101 to the terminal 102 via the routers 103', 104' and 105' uses the Record Route option to record the addresses of the various routers.

Accordingly, when the terminal 102 sends a dynamically routed response 202, as in FIG. 1, that terminal 102 also sends in parallel a supplemental message 203 that is forcibly routed to the router 105', which is the last router on the route of the request 201, whose address has been stored in the latter.

Having received this message 203, the router 105' in turn executes the method of the invention by sending a response 207 to the terminal 101 and a message 204 to the router 104'. According to the routing tables, the response 207 will cause an error at the router 104'. The process therefore continues for as long as a forcibly routed message has not reached the terminal 101.

Unlike the situation shown in FIG. 1, in which the terminal 101 has not received any usable information, when the above process has finished, the terminal 101 has received at least two messages, namely the message 206 forcibly routed from the router 103' and the response 209 dynamically routed from the same router.

These messages therefore indicate that the configuration error that led to the loss of the response 202 is not in the router 103', which restricts the search for the error to the routers 104' and 105'.

The invention claimed is:

1. A method of transmitting data packets in a telecommunication network made up of network nodes for dynamically routing successive packets sent by a sender to a receiver along different routes and using a protocol, by which the receiver receiving a request transmits a response to the sender of said request, the method comprising:
    transmitting the request for the response via a first route traversing the network nodes;
    recording addresses of the traversed network nodes in an order of traversing in the request;
    determining a second route based on a reverse order of the recorded addresses of the network nodes;
    generating a supplemental packet;
    contemporaneously transmitting the supplemental packet from the receiver to the sender of said request via the determined second route, from one node address to another node address, and dynamically routing the response from the receiver to the sender by reversely traversing the first route;
    receiving the supplemental packet at receiving intermediate network nodes traversed by the request in the reverse order based on the recorded addresses;
    generating an additional packet at each receiving intermediate network node; and
    forcibly forwarding the supplemental packet from each receiving intermediate network node to a next node in the reverse traversing order based on the recorded addresses and dynamically routing the generated additional packet from each receiving intermediate network node to the sender of the request by reversely traversing the first route.

2. The method claimed in claim 1, wherein said supplemental packet comprises a body identical to a body of said response.

3. The method claimed in claim 1, wherein said network node includes a router using dynamic routing tables and further comprising:
    forwarding a packet as a function of parameters including at least one of transmission delay or network traffic.

4. The method claimed in claim 1, wherein said telecommunications network includes Internet.

5. The method claimed in claim 1, wherein recording addresses comprise recording the addresses of the network nodes in a table and wherein determining the second route comprises modifying the table by deleting a last address from the table and further comprising:
    transmitting the supplemental packet to the last address in the modified table.

6. The method claimed in claim 1, further comprising:
    modifying the addresses at each receiving intermediate network node by deleting a last address comprising the address of a current receiving network node; and
    forcibly forwarding the supplemental packet from the current receiving network node to a new last address comprising the address of the next node in the reverse order of traversing based on the recorded addresses.

7. The method claimed in claim 1, further comprising:
    comparing the dynamically routed packets received at the sender to the forcibly forwarded packets; and
    identifying a malfunction in one of the network nodes based on comparing.

8. The method claimed in claim 1, further comprising:
    comparing the dynamically routed packets received at the sender to the forcibly forwarded packets; and
    identifying a malfunctioning node if the dynamically routed additional packet sent from the network nodes preceding the malfunctioning node is lacking at the sender.

9. The method as claimed in claim 1, wherein the network nodes preceding a malfunctioning node traversed by the request in the traversing order are not traversed by one of the dynamically routed response or the additional packet.

10. The method as claimed in claim 9, further comprising:
    identifying the malfunctioning node based on an absence of one of the response or the additional packet at the sender.

11. A server for transmitting data packets in a telecommunication network made up of network nodes for dynamically routing successive packets sent by a sender to a receiver along different routes and using a protocol, by which the receiver receiving a request transmits a response to the sender of said request, the server comprising:
    means for transmitting the request for the response by traversing the network nodes via a first route;
    means for recording addresses of the traversed network nodes in an order of traversing in the request;
    means for determining a second route based on a reverse order of the recorded addresses of the network nodes;
    means for generating a supplemental packet;
    means for dynamically routing said response from the receiver to said sender by reversely traversing the first route and contemporaneously forcibly transmitting a the supplemental packet, from one node address to another node address, from the receiver to the sender of said request via the determined second route;
    means for receiving the supplemental packet at receiving intermediate network nodes traversed by the request in the reverse order based on the recorded addresses;
    means for generating an additional packet at each receiving intermediate network node; and
    means for forcibly forwarding the supplemental packet from each receiving intermediate network node to a next node in the reverse traversing order based on the recorded addresses and contemporaneously dynamically routing the generated additional packet from each receiving intermediate network node to the sender of the request by reversely traversing the first route.

12. The server claimed in claim 11, wherein said supplemental packet comprises a body identical to a body of said response.

13. The server claimed in claim 11, wherein said network node includes a router using dynamic routing tables to forward the packet as a function of parameters including at least one of transmission delay or network traffic.

14. The server claimed in claim 11, wherein said telecommunications network includes Internet.

* * * * *